Sept. 16, 1941.    A. D. JARDINE ET AL    2,256,028
PORTABLE WELDING DEVICE
Filed March 17, 1941
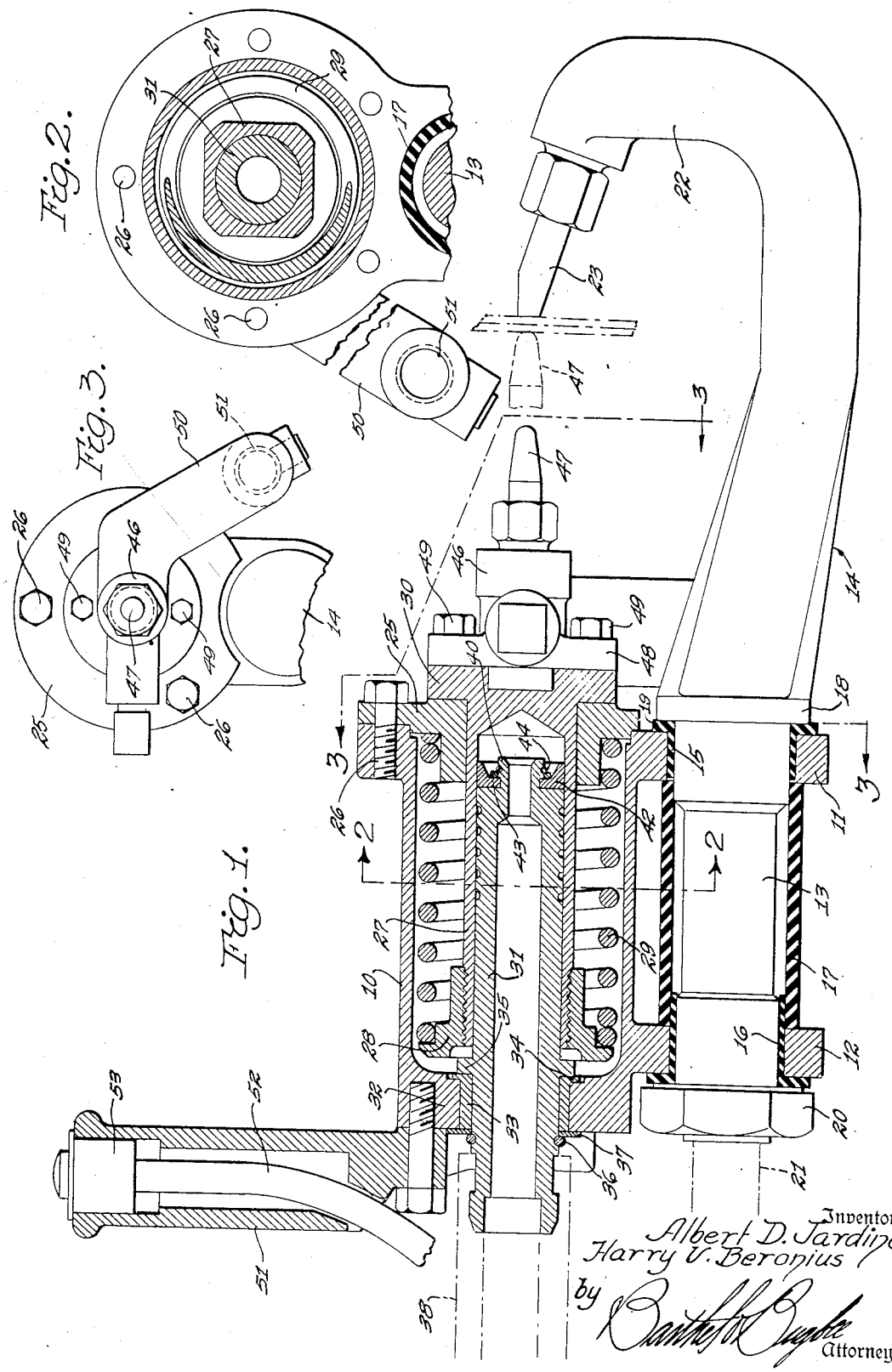
Inventor
Albert D. Jardine
Harry V. Beronius
by
Attorneys Patented Sept. 16, 1941

2,256,028

UNITED STATES PATENT OFFICE 2,256,028

PORTABLE WELDING DEVICE

Albert D. Jardine and Harry V. Beronius, Detroit, Mich.

Application March 17, 1941, Serial No. 383,691

6 Claims. (Cl. 219—4)

This invention relates generally to welding apparatus and more particularly to portable welding devices.

In portable welding devices of the character in which the electrodes are moved toward each other by a fluid pressure operated power element, it is the usual practice to connect the power element to a source of pressure, such as a master cylinder or prime mover, by a rubber hose. Because of the high pressure required to obtain good welding results, the hose, connecting the portable welder to a fluid pressure source, must be reenforced to the extent where it is substantially rigid. As a result, a workman cannot twist the hose and on occasions finds it difficult, if not impossible, to reach certain out of the way places to be welded. It has been proposed in the past to provide for turning of the hose at the pressure source or at the master cylinder, but this has resulted in bulky, expensive structures which have not been entirely satisfactory, among other reasons, because of the remoteness of the master cylinder or prime mover from the operator.

Accordingly, it is an object of the present invention to provide a new and improved portable welding device having a power element so constructed as to permit swiveling of the device relative to the hose connecting the power element to a source of fluid pressure.

Another object of the invention is to provide a portable welding device which may be swiveled relative to its hose connection and one which is fluid tight.

Other objects of the invention will become apparent from the following detailed description taken with the accompanying drawing in which:

Figure 1 is a side view partly in section of a portable welding device embodying features of our invention;

Fig. 2 is a view of the welding device shown partly in elevation and partly in cross section, taken along the line and in the direction of the arrows 2—2 of Fig. 1; and Fig. 3 is an end view of the device shown partly in cross section, taken along the line and in the direction of the arrows 3—3 of Fig. 1.

Referring to the drawing by characters of reference, the welding device shown includes a supporting member or power element casing 10 which is of general tubular form and is provided with a pair of integral, longitudinally spaced, external hollow bosses 11 and 12 in which is received and secured a rear end portion 13 of an electric conductor member 14. Surrounding the conductor end portion 13, within the hollow bosses 11 and 12 respectively are sleeves 15 and 16 and also surrounding the conductor end portion 13, but between the bosses 11 and 12, is a tubular spacer member 17, the sleeves 15 and 16 and the spacer member 17 being formed of an electric insulating material to insulate the conductor member 14 from the power element casing 10. An external shoulder 18, provided on the conductor member 14, abuts an outturned flange 19 of the insulator sleeve 15 and onto the rear end of the conductor member 14 is screwthreaded a nut 20 for securing the conductor and power element casing together. The conductor member 14 is usually referred to as the anvil since it is stationary or fixed relative to the power element casing 10. The rear end of the conductor member 14 is hollow to receive one end of an electric cable 21 which may be secured thereto by solder or by any other suitable means, and the other end of the cable 21 connects to a terminal of a source of electrical energy. As shown, the conductor member 14 extends forwardly of the power element casing and is provided with a hooked end portion 22 in the terminal end of which is secured an electrode 23 which is directed back toward the power element casing 10.

The front end wall of the casing 10 is provided with a removable plate member 25 which may be rigidly secured in place by screws 26 or by other suitable means, and the plate member 25 is provided with a centrally disposed, preferably square aperture in which the square shank of a reciprocal cylinder 27 is slidably received and guided. The cylinder 27 extends into the casing 10, and screwthreaded onto the inner end of the cylinder member 27 there is an adjustable abutment 28 for one end of a helical coil spring 29 which surrounds the cylinder 27 and has its other end abutting the inner surface of the casing end wall 25. The spring 29 is under compression and acts to move the cylinder inwardly or to the left, facing Fig. 1, inward or retractile movement of the cylinder being limited by an external flange 30 thereof engaging the outer wall surface of the casing end wall 25.

The cylinder 27 receives and slides on a piston 31, the rear end of which projects externally of the casing 10 through the casing rear end wall 32, in which wall a bushing 33 is preferably provided having an outturned flange 34 seating in a recess in the inner surface of the end wall 32. As shown, the piston 31 is provided intermediate its ends with an external flange 35 within the casing 10 for abutment with the inner end of the bushing 33 to limit outward movement of the piston and to lock frictionally the piston 31 and the cylinder 27 against relative rotation when the cylinder is moved outwardly by the fluid pressure. Externally of the casing 10, a snap ring 36, engaging in an annular groove in the piston 31, prevents inward movement of the piston and, preferably, a washer 37 is provided between the retainer ring 36 and the end wall 32 of the casing 10. The piston 31 is an open ended tubular member, the inner end of which leads into the reciprocal cylinder 27 and the outer end of which is connected to one end of a hose 38. The other end of the hose 38 may be connected to a source of fluid or hydraulic pressure such as a prime mover or master cylinder (not shown). An inner end portion of the piston 31 is reduced, as at 40, and fitted over this reduced portion 40 is a sealing member or cup 42 which is held in place by a washer 43 and a snap-on retainer ring 44 which is received in an annular groove provided in the piston reduced portion 40. The inner side wall of the sealing member or cup 42 is flared outwardly so that, when the fluid pressure acts against the flared wall, the cup is expanded tightly against the inner wall surface of the cylinder and also against the inner end of the piston to provide a good seal.

Carried by and rigidly secured to the outer end of the reciprocal cylinder 27, a detachable supporting member 46 is provided, and secured in and to the supporting member 46 there is an electrode 47 which is disposed toward and cooperates with the other electrode 23 in welding operations when the electrodes are moved and pressed against opposite sides of material to be welded. The supporting member 46 is provided with an enlarged or flanged end 48 which may be rigidly secured to the outer flanged end 30 of the cylinder by screws 49 or by other suitable means. Integral with and extending laterally and downwardly from the side of the supporting member 46, an arm 50 is provided with a hollow boss 51 wherein the other electric cable (not shown) is secured, such as, by means of solder or other suitable means. Rigidly secured to the power element casing there is a hollow handle to receive lead wires 52 of a circuit, controlling the prime mover or master cylinder, and in the end of the handle, a push button switch 53 is provided for convenience of the operator.

Operation

As previously mentioned, the interior of the reciprocal cylinder 27 is in communication through the hollow or tubular piston 31 and hose 38 with a source of fluid pressure, such as a prime mover or master cylinder which is controlled by the push button switch 53. When the operator, by means of the switch 53, closes the circuit of the prime mover, the pressure acting against the inner end of the cylinder 27 forces the cylinder outwardly, the electrodes being forced against opposite sides of the material to be welded with the proper pressure for good welding results. The pressure within the cylinder acting against the sealing member 42 expands the sealing member forcing it tightly against the inner wall surface of the cylinder 27. Also, the pressure acting against the sealing member 42 moves the piston 31 slightly rearwardly tightly pressing the piston flange 35 against the inner end of the bushing 33. The friction between the flange 35 and the inner end of the bushing 33 prevents relative rotation between the piston 31 and the cylinder 27 during the welding operation. When the pressure, acting against the cylinder 31, is released, the spring 29 acts to retract the cylinder moving it inwardly until the flange 48 thereof abuts the casing end wall 30. With the pressure released, it will be seen that the casing 10, together with all parts carried thereby, may be freely rotated about the piston 31 and relative to the hose 38, thus providing for positioning of the electrodes 23 and 47 in various positions to reach welding operations which may otherwise be difficult if not impossible to reach.

While we have shown and described a portable welding device, it is to be understood that our invention is not limited to such devices since the invention may be employed in various portable power tools of the character having a pneumatic or hydraulic power element.

What we claim is:

1. In a portable welding device, a supporting member, a conductor member carried by said supporting member and having an electrode, a reciprocable cylinder carried by said supporting member and carrying an electrode for cooperation with the first-named electrode, an open ended tubular piston in said cylinder and having an outer end for connection by a flexible conduit to a source of fluid pressure to move said cylinder in one direction, said cylinder being reciprocable relative to said piston and said supporting member being rotatable relative to said piston, and means for moving said cylinder in the opposite direction.

2. In a portable welding device, a casing having opposite end walls, a conductor member carried by said casing externally thereof and having an electrode, a reciprocable cylinder in one of said end walls and carrying an electrode for cooperation with the first-named electrode, an open ended tubular piston rotatably supported intermediate its ends in an aperture in the other end wall of said casing, said piston extending into and slidably receiving and guiding said cylinder and having an outer end for connection with a hose in communication with a source of fluid pressure, the pressure acting within and against said cylinder moving said cylinder outwardly, and means within said casing for retracting said cylinder upon decrease in fluid pressure acting thereagainst.

3. In a portable welding device, a casing, a conductor member carried by said casing and carrying an electrode, a reciprocable cylinder in said casing and externally thereof carrying an electrode for cooperation with the first-named electrode, an open ended tubular piston in said cylinder, said piston extending through a wall of said casing and having an external end for connection by a hose to a source of fluid pressure for moving the cylinder outwardly of said casing, said casing and said piston being relatively swivelable so that the electrodes may assume various positions, means cooperable upon application of the pressure to hold said casing and said piston against swiveling movement, and means for retracting said cylinder upon decrease of the fluid pressure.

4. In a portable welding device, a casing having a front and a rear wall, a conductor member rigidly secured to said casing and carrying an electrode, a reciprocable cylinder slidably received and guided in an aperture in the front wall thereof, a conductor member carried by said cylinder externally of said casing and carrying an electrode for cooperation with the first-named electrode, a hollow open ended piston rotatably mounted on the rear wall of said casing and received in said cylinder, said piston having an external end for connection by a hose to a source of fluid pressure, said piston having an external abutment within said casing whereupon application of the fluid pressure releasably and frictionally locks said casing and piston against relative rotation, and means for retracting said cylinder upon decrease of the fluid pressure.

5. In a portable welding device, a casing having front and rear walls, a conductor member secured to said casing externally and laterally thereof and supporting an electrode directed toward the casing front wall, a multi-sided reciprocable cylinder slidably received and guided in a corresponding multi-sided aperture in the casing front wall to prevent turning of the cylinder relatively to said casing, an electrode mounted on the outer end of said cylinder for cooperation with the first-named electrode, a piston rotatably mounted in an aperture in the casing rear wall and slidably fitting into said cylinder, said piston having an outer end for connecting to a hose to connect said cylinder to a source of fluid pressure, and means operable to retract said cylinder upon decrease in fluid pressure acting thereagainst.

6. In a portable welding device, a casing having a rear wall, a removable electric conductor front wall for said casing and having a multi-sided aperture therethrough, a conductor member mounted on said casing externally and laterally thereof and supporting an electrode directed toward the casing front wall, a reciprocable externally multi-sided cylinder slidably received and guided in the aperture in said removable front wall and on its outer end having stop means to engage said front wall to limit inward movement of said cylinder, a hollow open ended piston rotatably mounted in an aperture in said rear wall and extending into said cylinder, said piston having an outer end for communication with a source of fluid pressure to force said cylinder outwardly, means for limiting longitudinal movement of said piston, and means for retracting said cylinder upon decrease in the fluid pressure acting thereagainst.

ALBERT D. JARDINE.
HARRY V. BERONIUS.